Feb. 10, 1959
P. BOTTO
2,872,911
LIQUEFIED PETROLEUM GAS PRESSURE MIXER
Filed March 22, 1955
2 Sheets-Sheet 2
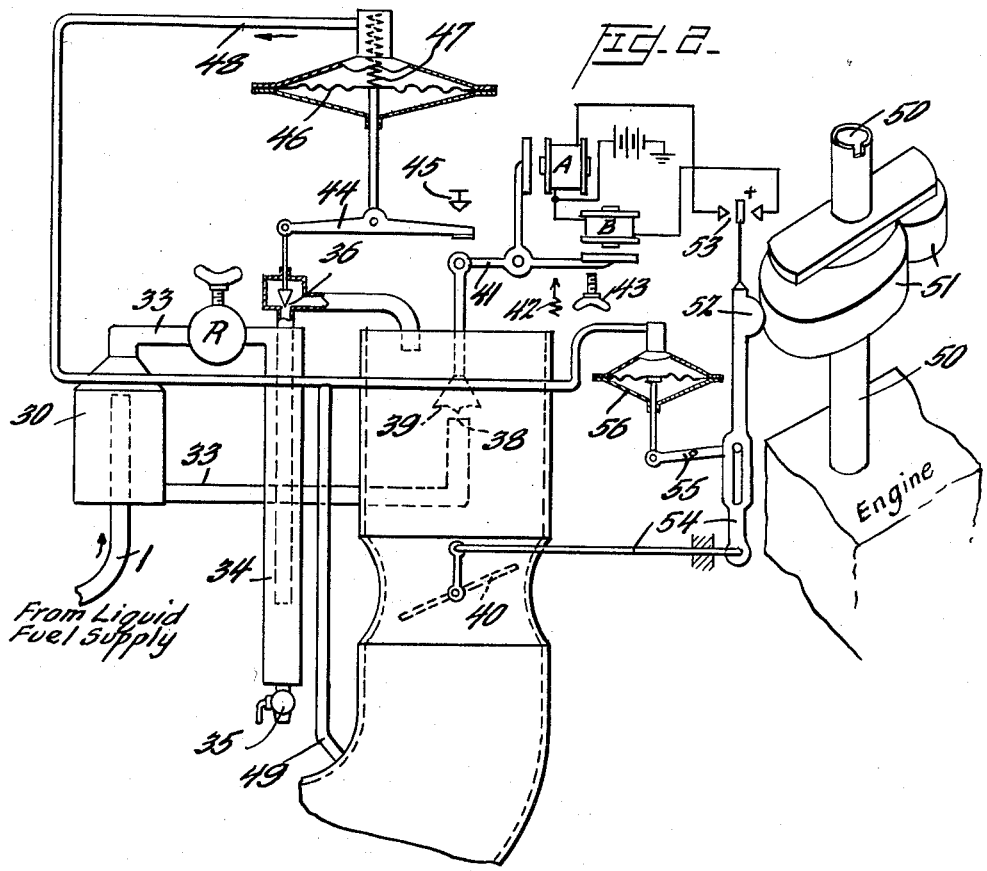
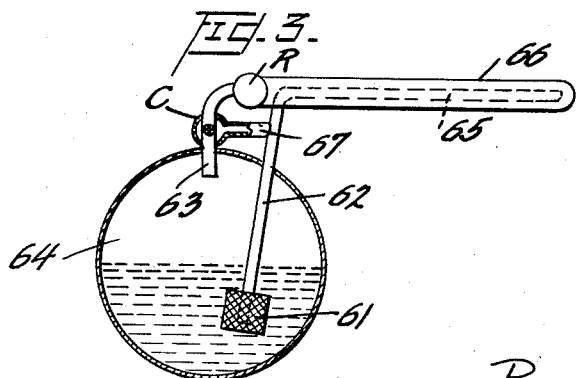
INVENTOR
Piero Botto
BY Watson, Cole, Grindle & Watson
ATTORNEYS

United States Patent Office 2,872,911
Patented Feb. 10, 1959

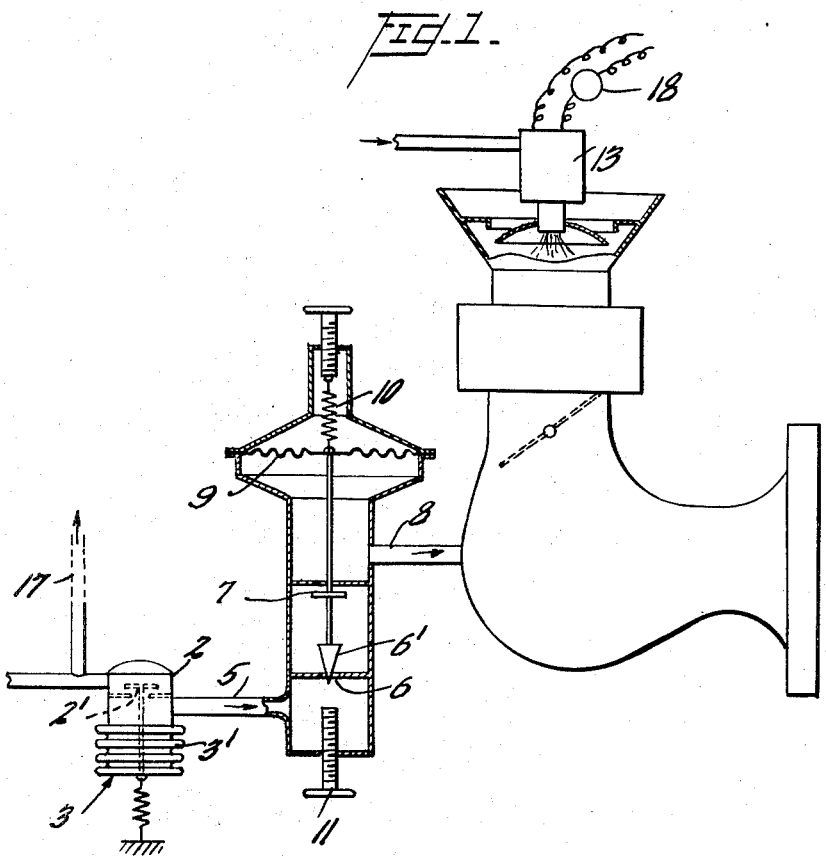

2,872,911

LIQUEFIED PETROLEUM GAS PRESSURE MIXER

Piero Botto, Rome, Italy, assignor to Officine Botto-Meccanica di Precisione-Societa a. r. l., Rome, Italy, a limited company Application March 22, 1955, Serial No. 495,847

Claims priority, application Italy March 29, 1954

7 Claims. (Cl. 123—120)

It is known that liquefied petroleum gas pressure mixers as commonly used for explosion engines presuppose the reduction of the pressure of said liquefied petroleum as far as to reach a pressure which is somewhat lower than atmospheric pressure. Thus, it is the question of vacuum mixers, whose working, inter alia, depends upon the maintenance of a regular gauging, which always runs a certain risk of being lost owing to natural oscillations of the atmospheric pressure.

The object of the present invention is to provide a liquefied petroleum gas mixer for feeding explosion engines, which does away with said drawback, insofar as the fuel is introduced into the suction conduit of the engine at a pressure which is higher than atmospheric pressure, both in the gaseous condition and in the liquid vaporised condition, two distinct units for feeding the engine to minimum and to maximum speed being provided therein.

Another object of the invention is to provide a mixing and carburetting system for explosion engines and internal combustion engines, which improves the utilization of the ideas on which the mixer disclosed hereinafter is based, as well as the means which enables said mixing system to be put into effect.

According to one form of embodiment, the mixer receives the liquefied petroleum gas after the same has passed from a supply container to a pressure reducer and subsequently to a vaporizer, both of which may be provided in only one apparatus and function to supply a gaseous current at a pressure higher than atmospheric pressure, so as to avoid in the mixer the harmful effects due to natural variations of the atmospheric pressure itself.

According to still another form of embodiment referring to the manner of utilizing the mixer forming the object of the invention, the fuel coming from the container reaches a cup, within which the separation of the gaseous layers from the liquid layers is obtained and the liquid portion of the fuel flows directly into a nozzle having an adjustable port and from which it is sprayed in a vaporized condition into the carburettor.

Variations of the inflow from the nozzle may be obtained by varying the stroke of the nozzle valve aperture or by quickly and frequently opening and closing the valve itself as well as by adjusting the opening time with respect to the closing time.

The gaseous portion, instead, according to the mixing system of the invention, passes through a pressure reducer, which introduces the gas (at a pressure about 0.5 atmosphere above the ambient pressure) into a vaporizer, from where it reaches the carburettor.

The mixer and the means to put the mixing system into effect, are illustrated by way of example only, without any limitation, in the annexed drawings, in which:

Fig. 1 diagrammatically shows a first embodiment of a pressure mixer which is in communication with a conventional carburettor;

Fig. 2 diagrammatically represents a mixer according to a modification of the invention;

Fig. 3 is a diagrammatic view of another modification of the invention, in which both the intake in the vapour condition and the intake in the liquid condition are directly performed from the container.

Referring to said drawings, in the diagram of Fig. 1 the liquefied petroleum gas coming from a supply container (not shown) passes by way of a conduit 1 into a pressure reducer 2 and a vaporizer 3, which form an apparatus provided with metal bellows 3', into which, through a passage determined by a valve 2', liquefied petroleum gas is sprayed in a liquid condition.

The opening of valve 2' is controlled by a spring 4 which is gauged in such a way as to have its resistance overcome by the pressure when it reaches a determined value, and the closing of said valve is determined by a stretching action of bellows 3' owing to the internal pressure produced by the vaporization of the liquefied petroleum gas.

Upon having been reduced into vapour condition, at the preferred pressure of 1.5/2 absolute atmospheres, the liquefied petroleum gas is delivered through conduit 5 to nozzle 6, whose port is varied by a cone 6' which is more or less introduced into nozzle 6, cone 6' being integral with a cut-off valve 7 operated by a diaphragm 9 which is controlled by the vacuum of the engine through a connecting tube 8. A spring 10 is provided to normally urge diaphragm 9 to a position of rest at which valve 7 is closed.

Thus, when the engine runs at a minimum speed, a maximum vacuum is reached in connecting tube 8 and valve 7 moves down, so as to effect a maximum downward movement of cone 6' to a limit established by set screw 11. This action, by increasing the speed of the engine, decreases the vacuum in passage 8 and spring 10 draws back cone 6', permitting a greater delivery of liquefied petroleum gas.

At a higher speed of the engine, besides supplying liquefied petroleum gas in a gaseous condition, it will be convenient to proceed with the direct injection of vaporized liquid fuel. The direct injection of the liquified petroleum gas is performed by means of an electromagnetic cut-off valve 13 which sprays said gas at very short intervals into the carburettor, this valve being controlled by an electric breaker 18 which feeds it with current impulses whose number and duration are variable in accordance with the revolutions of the engine and the throttle.

The means permitting the mixing system of the invention to be put into effect are better illustrated in Fig. 2, representing a modification which shows in detail what is represented in Fig. 1 and disclosed in connection therewith. The fuel coming from conduit 1 reaches a cup 30, at the top of which possible gaseous layers are collected, whereas at the bottom of said cup the fuel in a liquid condition is collected. The latter flows through conduit 33' a nozzle 38 having an adjustable port, by which it is sprayed in a vaporized condition into the carburettor. Nozzle 38 is provided with an opening needle 39 just acting as vaporizer, which through a lever system 41 is periodically operated by means of a pair of electromagnets A and B, performing the opening and closing action, respectively. A spring 42 serves the purpose of exerting a slight initial closing pressure. A screw 43 is used to gauge the mixer, a single setting of the screw regulating the maximum deflection of the anchor or lever system 41. Current impulses are made to flow alternatively through the two electromagnets A and B by means of a rotary commutator mounted on a shaft 50 which is rotated by the engine. The rotary commutator is provided with a cam 51 having centrifugal expansion, which engages an armature 52 that is adapted to make contact with platinum plated nails 53. The position of armature 52 is determined by the position of the carburettor throttle 40 which, through levers 54 and 55, controls the throw of the armature and, consequently, the time of contact with platinum plated nails 53. A diaphragm 56 pneumatically controlled by the vacuum existing in suction conduit 49 may vary the lever arm 55 of the armature and, thus, vary, in due time, the poorness and richness of the mixture.

The gaseous layers collected in the upper part of the cup pass through tube 33 and over a reduction cock R to reach a vaporizer 34 provided with a cock 35. The adjustable reduction cock R reduces the pressure existing in cup 30 to an acceptable value which is preferably 0.5 atmosphere above ambient pressure. Vaporizer 34 is secured to a warm part of the engine or it is otherwise heated, and serves to complete the vaporization of the fuel which, through a needle valve 36, whose opening action is controlled, is led to the carburettor by means of nozzle 37. According to the importance which is desired to be given feeding liquid fuel, the operating device of valve 36 is devised differently.

Thus, if the feeding with gaseous fuel is desired to be restricted to the minimum speed of the engine, valve 36 may be reduced to a simple valve having its opening and closing actions controlled by a diaphragm 46 (provided with spring 47) which is operated by the suction of the vacuum existing in point 49 of the carburettor, said diaphragm being also able to conveniently lock nozzle 38—39 by means of lever 44.

As diagrammatically shown in the drawing, valve 36 opens in the direction of the pressure, but, if it is so desired, it may be caused to close in the direction of the pressure, which may prove to be convenient for applying ordinary vaporizers or for balancing the consequences due to variation of pressure of the fuel.

According to a modification shown in Fig. 3, the transparent cup is altogether done away with, and the intake of liquefied petroleum gas both in the liquid and in the gaseous condition may be directly performed from the container of the engine.

In this system, the supply container is reached by two tubes, of which tube 62, having an intake filter 61, extends downwards in the container, to withdraw liquefied petroleum gas in a liquid condition, and tube 63, terminating above the liquid lever in the container, withdraws liquefied petroleum gas in a gaseous condition. Point 64 indicates the liquid level of the liquefied petroleum gas inside the container. On the gaseous fuel inlet connecting tube 63 a commutator C is provided, by means of which both liquid and vaporised fuel or both of them may be delivered in the various proportions to reducer R, arranged on the downstream side commutator C communicating with the liquid inlet tube 62 through an additional tube 67. As already stated, a reducer R is provided in tube 63 on the downstream side of the container and of commutator C, by which reducer a cooling of the gaseous fuel is obtained due to the reduction of pressure, and as this cooling increases, the proportion of liquid fuel introduced by commutator C increases. Down-stream of the coupling point of connecting tube 67 on tube 62, providing for the inlet of fuel in a liquid condition, and the accommodation point of reducer R on tube 63, providing for the inlet of fuel in a gaseous condition, tube 62 enters tube 63 as far as to reach the mixer. Since conduit 65 for the liquid is thereby surrounded by the gaseous fuel coming from the reducer which passes into the larger tube 66, the liquid fuel which reaches the mixer is cooled to a temperature which is lower than its boiling temperature. This avoids the formation of vapour bubbles and permits the insertion of a pressure reducer adapted to reduce the pressure of the liquid to a constant value independently from the ambient temperature, that is to say, to a value equal or less than that corresponding to the minimum ambient temperature. Thus, it will be possible to obtain a more regular and constant gauging for the mixer to which the fuel is subsequently fed.

Not only does tube 62, which provides for the inlet of fuel in a liquid condition, take advantage of the aforesaid arrangement, but this particular device enables liquid particles to be removed from the vapour circulating in the intervening space of the two tubes, which particles, by receiving heat both from the outside and from the inner tube, will evaporate along the path to reach the mixer.

It is to be noted that the unit as illustrated may be conveniently utilized as a whole or work with only some of its members by limiting, if necessary, the use to the liquid carburetting circuit or to the gaseous carburetting circuit. Lastly, the device according to the invention is suitable for the carburization of liquids, such as gasoline, provided they are forced into the conduit by a suitable feeding pump.

What I claim is:

1. Apparatus for supplying fuel to an internal combustion engine including an intake manifold having a vacuum therein, which apparatus comprises a common source of liquid and gaseous fuel, the latter being maintained under super atmospheric pressure, separate conduits for feeding said fuels to said manifold, a needle valve in said gaseous fuel conduit, a diaphragm connected to said needle valve and communicating with said manifold to position said valve in accordance with the vacuum in said manifold, a vaporizing nozzle at the termination of said liquid fuel conduit within said manifold, a closure member for said nozzle, and means for rapidly opening and closing said member at a frequency varying in response to the operating conditions of said engine.

2. The apparatus as in claim 1 including a pressure reducer in said gaseous fuel conduit to reduce the pressure of said fuel to slightly above atmospheric and thereby cool said fuel and means for passing said liquid fuel in heat exchange relationship with said cooled gaseous fuel to thereby cool said liquid fuel.

3. Apparatus for injecting liquid fuel into the intake manifold of an internal combustion engine comprising a source of said fuel, means for connecting said source with said manifold, said means including a nozzle for vaporizing said fuel, a valve member for said nozzle oscillatable between positions at which said nozzle is open and closed, respectively, means for oscillating said member at a rapid frequency, and means for varying said frequency in response to operating conditions of said engine.

4. The apparatus as in claim 3 wherein said frequency varying means includes a pivotable arm operable to move said member from one position to the other, and a cam rotated by said engine to pivot said arm.

5. The apparatus as in claim 4 including means for varying the initial position of said arm with respect to said cam to control the dwell of said valve member at any of said positions, and a throttle valve in said manifold connected to said position-varying means whereby the position of said throttle influences the period of dwell.

6. The apparatus as in claim 5 including means for varying the position of the pivotal axis of said arm along the longitudinal axis thereof and a diaphragm communicating with said manifold and connected to said axis-varying means for effecting the variation in the position of said axis.

7. The apparatus as in claim 3 including an electromagnet for moving said closure member from each of said positions to the other, an electric circuit for energizing each of said magnets, an armature common to both circuits and closing one of said circuits in one position and the other in another position, said armature being carried at one end of a movable arm, a pivotal axis for said arm intermediate its ends and having a sliding connection therewith whereby the position of said axis may be varied longitudinally of said arm, a diaphragm communicating with said manifold and connected to said axis to move the same, a throttle valve for said manifold and a connection between said valve and the other end of said arm to pivot said arm about said axis as said throttle valve is opened and closed, and a cam rotated by said engine and making contact with said arm intermediate said armature and said axis to move the armature from one position to another.

References Cited in the file of this patent

UNITED STATES PATENTS 2,645,570     Anderson _____ July 14, 1953